United States Patent [19]
Tan

[11] Patent Number: 5,914,799
[45] Date of Patent: Jun. 22, 1999

[54] OPTICAL NETWORK

[75] Inventor: Han Hiong Tan, Berkel en Rodenrijs, Netherlands

[73] Assignee: Koninklijke PTT Nederland N.V., Netherlands

[21] Appl. No.: 08/708,352

[22] Filed: Sep. 4, 1996

[30] Foreign Application Priority Data

Sep. 15, 1995 [NL] Netherlands ............................ 1001209

[51] Int. Cl.$^6$ .................................................. H04J 14/02
[52] U.S. Cl. ......................... 359/167; 359/125; 359/134; 359/179; 359/345
[58] Field of Search ..................................... 359/121, 125, 359/137, 167, 133, 134, 345, 174, 179, 178, 160, 164

[56] References Cited

U.S. PATENT DOCUMENTS

| | | | |
|---|---|---|---|
| 4,934,775 | 6/1990 | Koai ........................................ | 350/96.14 |
| 5,077,728 | 12/1991 | Kaminow ................................. | 359/124 |
| 5,210,631 | 5/1993 | Huber et al. ............................. | 359/125 |
| 5,241,414 | 8/1993 | Giles et al. ............................... | 359/341 |
| 5,287,216 | 2/1994 | Chirravuri et al. ...................... | 359/341 |
| 5,301,054 | 4/1994 | Huber et al. ............................. | 359/125 |
| 5,321,707 | 6/1994 | Huber . | |
| 5,331,449 | 7/1994 | Huber et al. ............................. | 359/125 |
| 5,467,212 | 11/1995 | Huber ...................................... | 359/168 |
| 5,631,758 | 5/1997 | Knox et al. .............................. | 359/127 |
| 5,793,507 | 8/1998 | Giles et al. ............................... | 359/125 |

FOREIGN PATENT DOCUMENTS 2 265 271  9/1993  United Kingdom .

OTHER PUBLICATIONS

K. Okada et al, "Introduction Approach Toward Full Fiber–Optic Access Network", *Proceedings of ICC '91—International Conference in Communications*, Jun. 23–26, 1991, vol. 2, pp. 903–907.

*Primary Examiner*—Edward Lefkowitz
*Attorney, Agent, or Firm*—Michaelson & Wallace; Peter L. Michaelson

[57] ABSTRACT

Optical network for signal transfer from a central station to subscriber stations. The signal to be distributed is split in at least two stages, with the signal being amplified by optical amplifiers. The Erbium Doped Fiber Amplifiers (EDFAs) to be used for this purpose are fed by an optical supply signal. By building up the supply signal from various signals with wavelengths lying closely together, Stimulated Brillouin Scattering (SBS) is avoided. As a result, by utilising centrally supplied EDPAs more splitting stages may be applied, as a result of which many more subscribers may be reached from one signal source than before. The subscribers may utilize inexpensive, low-sensitivity receivers. The optical network is particularly suited to form, in conjunction with a conventional non-optical (twisted-pair) network, a hybrid bi-directional transmission system. In this connection, the optical network is intended for the distribution of wide-band signals (CATV) and the non-optical network for bi-directional transfer of narrow-band signals.

5 Claims, 2 Drawing Sheets

OPTICAL NETWORK

BACKGROUND OF THE INVENTION

The invention relates to an optical network, the transfer of a signal from a central station to subscriber stations taking place via of optical fibres, and the signal transferred by the central station being split, by a signal splitter in a splitting stage, into several output signals.

So far it has been customary, in the event of such networks not to go beyond one splitting stage which splits the signal into, e.g., 16 or 32 output signals. Further signal splitting would result in a low signal strength which would require sensitive, expensive optical receivers at the subscribers.

SUMMARY OF THE INVENTION

The invention provides for a considerable increase in the number of output signals without, however, the optical receivers at the subscribers requiring a great sensitivity. According to the invention, such may be achieved if the output signals are split, in a second splitting stage, by one or more second signal splitters after, however, having been amplified by an optical amplifier. There may possibly be added still further splitting stages. It is essential for the present invention that the power reduction occurring in each splitting stage be compensated by optical amplifiers.

As amplifiers, there may be used EDFAs (Erbium Doped Fiber Amplifiers). These consist of a piece of erbium-doped glass fiber to which there is presented, by way of a coupler, the signal to be amplified, as well as a supply signal. The supply signal is generated in a "pumping laser". The supply signal has a wavelength which does not lie that far below the wavelength of the signal carrier.

The EDFAs may be supplied by one or more pumping lasers in the immediate vicinity of the EDFAs, in the local distributor ("curb"). A drawback hereof is that the curbs must then be connected to the electricity grid in order to electrically supply the pumping laser(s).

Preferably, therefore, the pumping lasers are placed in the central station and the "pumping powers" for the EDFAs are supplied, by way of optical "pumping fibres", to the curbs. The required power is so great (approx. 100 mW per EDFA), however, that the pumping signals, as a result of "Stimulated Brillouin Scattering" (SBS) in the pumping fibres, are not capable of being transferred over the relatively large distance from the central station to the curbs.

This problem may be solved according to a preferred embodiment of the invention, however, by making use of, on the one hand, the discovery that SBS in the event of transferring a large power over a large distance does not occur if the supply signal is broken down into a number of supply signals with reduced powers having, within a certain wavelength range, different wavelengths. On the other hand, it was discovered that EDFAs are not very critical as far as the wavelength of the supply signal is concerned. It has turned out that EDFAs which are included in a transmission system having a carrier wavelength of 1550 nm, which are normally supplied with a supply signal having a wavelength of 1480 nm, function just as well if they are supplied by a number of supply signals with a wavelength of roughly 1480 nm having a mutual wavelength difference of some 10 to 100 MHz or over, each having a reduced power. Use is made of, e.g., 10 supply signals, each having a power of 10 mW, with which a combined power of 100 mW is transferred. The supply sources are, e.g., 10 lasers, each giving off 100 mW—each with somewhat different wavelengths $1_1$ . . . $1_{10}$—to an optical 10×10 splitter which on the one hand combines the 10 supply signals to a signal having a power of 10×100 mW and on the other hand splits it into 10 supply signals, each composed of 10 signals having a power of 10 mW and wavelengths $1_1$ . . . $1_{10}$, respectively, as a result of which the total power per composite supply signal is 100 mW.

EXEMPLARY EMBODIMENT

Figure 1:
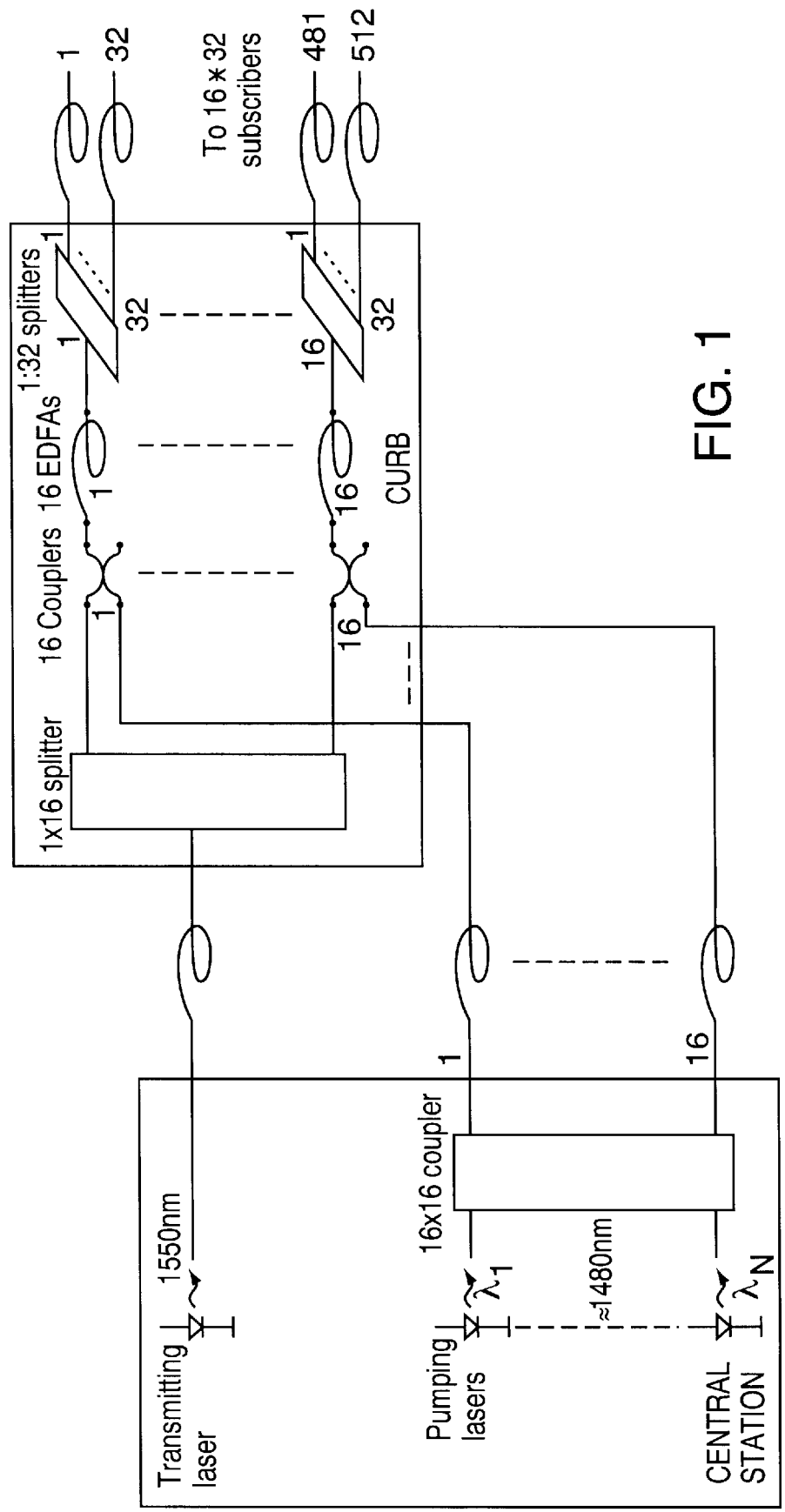
FIG. 1 depicts an exemplary embodiment of the invention.

FIG. 1 shows an exemplary embodiment of the invention. In a signal distributor ("curb"), an optical signal originating from a central station and modulated by information having a wavelength of 1550 nm is distributed, by way of a splitter, among 16 outputs. Resulting output signals are amplified by 16 EDFAs. The EDFAs are supplied, by way of 16 optical couplers, with an optical supply signal of approx. 1480 nm. In order to avoid "scattering" (SBS), the supply signal is composed of 16 signals having wavelengths of around 1480 nm and a mutual wavelength differential of 0.1 GHz (in practice this differential, depending on the fibre properties, may be even lower, down to approx. 0.01 GHz). The table below gives the laser wavelengths and frequencies.

| Pumping laser 1  | l = 1479,992 nm | f = 135135,8 GHz |
| Pumping laser 2  | l = 1479,993 nm | f = 135135,7 GHz |
| Pumping laser 3  | l = 1479,995 nm | f = 135135,6 GHz |
| Pumping laser 4  | l = 1479,996 nm | f = 135135,5 GHz |
| Pumping laser 5  | l = 1479,997 nm | f = 135135,4 GHz |
| Pumping laser 6  | l = 1479,998 nm | f = 135135,3 GHz |
| Pumping laser 7  | l = 1479,999 nm | f = 135135,2 GHz |
| Pumping laser 8  | l = 1480,000 nm | f = 135135,1 GHz |
| Pumping laser 9  | l = 1480,001 nm | f = 135135,0 GHz |
| Pumping laser 10 | l = 1480,002 nm | f = 135134,9 GHz |
| Pumping laser 11 | l = 1480,003 nm | f = 135134,8 GHz |
| Pumping laser 12 | l = 1480,004 nm | f = 135134,7 GHz |
| Pumping laser 13 | l = 1480,005 nm | f = 135134,6 GHz |
| Pumping laser 14 | l = 1480,007 nm | f = 135134,5 GHz |
| Pumping laser 15 | l = 1480,008 nm | f = 135134,4 GHz |
| Pumping laser 16 | l = 1480,009 nm | f = 135134,3 GHz |

The supply signals generated by the various pumping lasers—each with a power of 100 mW—are combined with one another in a 16×16coupler (total power 16×100 mW) and subsequently split into a number of supply signals to which each pumping laser did supply its contribution. The power of each of the supply signals is 100 mW, composed of 16 signals of different wavelengths, each having a power of 100/16 mW.

Each of the outputs of the EDFAs is connected to a 1×32splitter, which splits the signal amplified by the EDFA into 32 output signals which are presented, by way of 32 optical fibres, to 32 subscribers. In total, therefore, 16 * 32=512 subscribers are served. Since the optical power of the signals presented, as a result of the amplification by the EDFAs, is relatively large, the subscribers may convert the signals into electric signals, making use of simple linear optical receivers which are very inexpensive.

Figure 2:
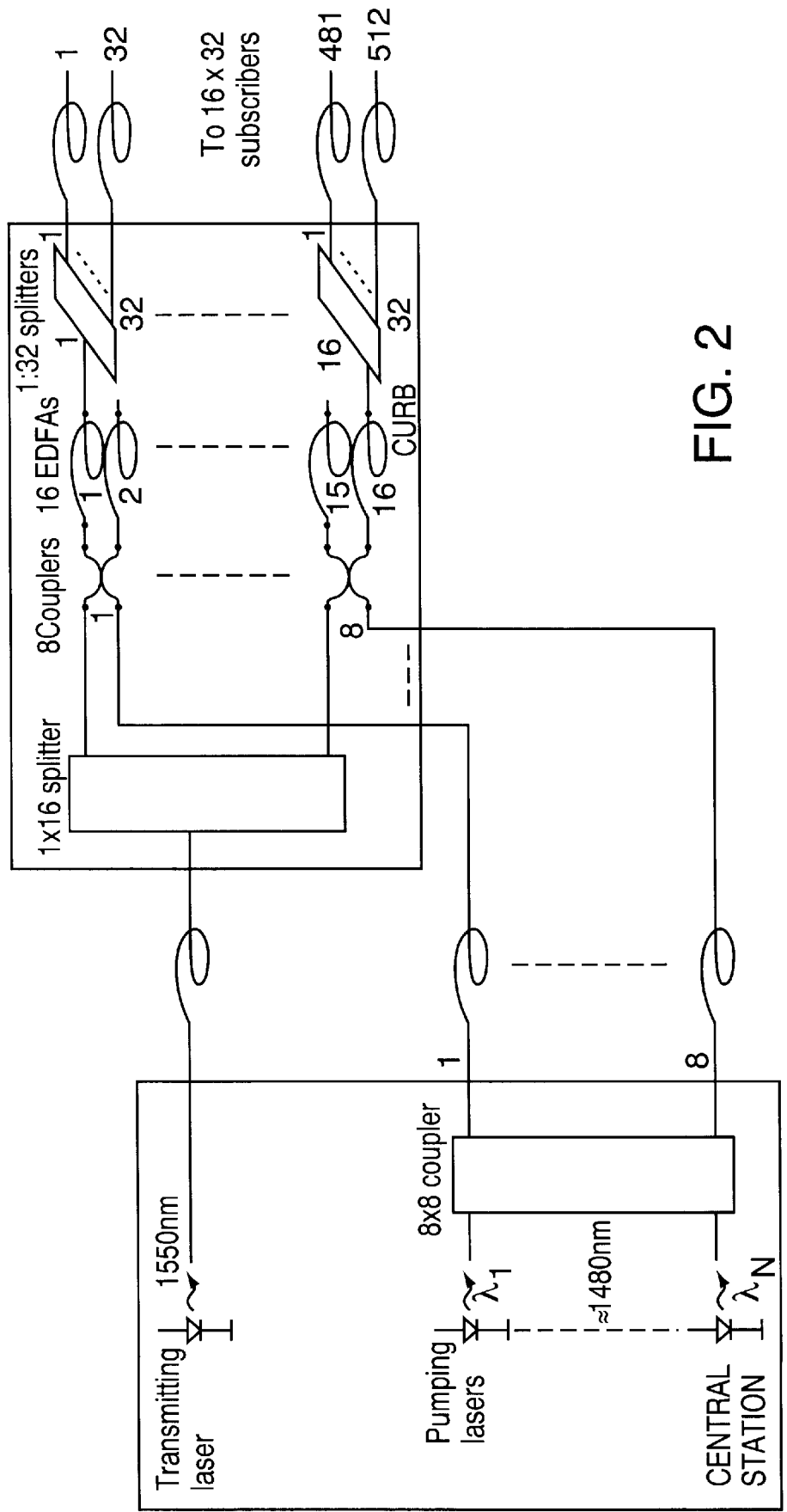
FIG. 2 depicts a modification of the embodiment shown in FIG. 1.

FIG. 2 shows a modification as compared to FIG. 1 regarding the supply of the EDFAs. By supplying the 16 EDFAs with a supply signal formed by 8 instead of 16 signals having different wavelengths, e.g., supplied by the pumping lasers 1 up to and including 8 from the above table, there may be obtained a reduction in the number (now 8) of "supply couplers", namely, if there are coupled to each of said couplers not one but two EDFAs, as shown in FIG. 2.

Finally, it should be noted that the system described above provides for "downstream" signal transfer, from the central station to the subscribers, as this takes place, e.g., in CATV distribution. With a view to interactive TV and "video on demand" etc., there should also be, however, provisions for "upstream" signal transfer. In addition, subscribers must be provided with provisions for bidirectional signal transfer for the benefit of telephone, telefax and data traffic. Although it would appear to be obvious, for the construction of new networks ("green-field" locations), to opt for bi-directional (completely or largely) optical connections, it is proposed by the applicant in green-field situations to jointly install, simultaneously with the optical fibres, conventional "twisted-pair" copper veins. In this connection, the optical fibres are intended for downstream distribution of wide-band signals for, in particular, CATV, while the twisted-pair veins are used for telephone, telefax and (private and small-business) data traffic. The upstream signals for the benefit of "video on demand" and interactive TV (selection or "televoting" commands), too, are transferred by way of the twisted-pair veins. This hybrid configuration, consisting of a fully optical distribution network for downstream signals combined with a twisted-pair network for upstream and bi-directional transfer of narrow-band signals, turns out to have an unexpectedly favourable performance/price ratio. For locations where twisted-pair networks are already present, the hybrid solution is very suitable as well. For clarity's sake, in FIGS. 1 and 2 the twisted-pair network was omitted. Generally known is the setup of such a conventional network, which usually consists of copper cables with a great number of twisted-pair copper veins, which run to different curbs, from where, thin copper cables are run, usually having two twisted pairs, to the subscribers. In green-field situations, a choice will be made for common curbs for the optical and the copper cables; in the event of existing networks, there will often be placed new curbs which are only used by the new optical network. Having said this, it is obvious that not only twisted-pair copper networks are applicable, but possibly other nonoptical bidirectional networks as well.

I claim:

1. An optical network for transferring a signal, via optical fibers, from a central station to a plurality of subscriber stations, wherein the network comprises:
   a first signal splitter, in a first splitting state, for optically splitting the signal into a plurality of first stage output optical signals;
   a first amplifying stage having a plurality of optical erbium doped fiber amplifiers (ERDAs), in a first amplifying stage, wherein a different corresponding one of said ERDAs optically amplifies a different one of the first stage output optical signals so as to yield a different corresponding one of a plurality of amplified first stage optical signals; and
   a second signal splitter, in a second splitting stage, for optically splitting each one of the amplified first stage optical signals to yield a corresponding plurality of second stage output optical signals;
   wherein each one of the ERDAs is supplied from a corresponding one of a plurality of substantially identical optical supply signals produced by a common optical supply source, the supply source having a plurality of different optical emitters wherein each of the emitters produces optical energy at a different predefined wavelength and simultaneously with all the other emitters, and a coupler for optically combining optical energy simultaneously produced by all the emitters so as to form the plurality of optical supply signals, wherein each of the optical supply signals comprises a plurality of simultaneously occurring optical signals each produced by a different one of the emitters and having optical energy at a different corresponding one of the predefined wavelengths.

2. The optical network in claim 1 further comprising:
   a second amplifying stage having a second plurality of said amplifiers, wherein each one of the second plurality of amplifiers optically amplifies a different one of the second stage output signals to yield a corresponding one of a plurality of amplified second stage optical signals; and
   a third signal splitter, in a third splitting stage, for optically splitting each one of the amplified second stage optical signals to yield a corresponding plurality of third stage output optical signals.

3. The optical network in claim 1 wherein the simultaneously occurring optical signals have a mutual frequency distance from one another of at least 10 MHz.

4. The optical network in claim 1 wherein all of the simultaneously occurring optical signals have substantially equal optical power.

5. The optical network in claim 1 wherein the optical supply source comprises:
   a plurality of optical signal generators for producing N optical signals of mutually differing wavelengths; and
   an N-by-N coupler, having N inputs and N outputs, the N optical signals being applied to the N inputs, for combining the N optical signals with one another so as to form, at the N outputs, N combined signals, each of said combined signals having an optical component at each one of said differing wavelengths, wherein each of the optical amplifiers is connected to a corresponding one of the N outputs.

* * * * *